US012512626B2

(12) United States Patent
Guo et al.

(10) Patent No.: US 12,512,626 B2
(45) Date of Patent: Dec. 30, 2025

(54) CONNECTOR AND ASSEMBLY THEREOF WITH FOOLPROOF STRUCTURE

(71) Applicant: LUXSHARE TECHNOLOGIES INTERNATIONAL, INC., Milpitas, CA (US)

(72) Inventors: Rongzhe Guo, Dongguan (CN); Hengshan Cheng, Dongguan (CN); Hongji Chen, Dongguan (CN); Yunfeng He, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 796 days.

(21) Appl. No.: 17/839,873

(22) Filed: Jun. 14, 2022

(65) Prior Publication Data

US 2022/0407268 A1 Dec. 22, 2022

(30) Foreign Application Priority Data

Jun. 16, 2021 (CN) ......................... 202121340213.0

(51) Int. Cl.

| | |
|---|---|
| ***H01R 13/6581*** | (2011.01) |
| ***H01R 12/72*** | (2011.01) |
| ***H01R 12/75*** | (2011.01) |
| ***H01R 13/6587*** | (2011.01) |
| *H01R 13/648* | (2006.01) |
| *H01R 13/658* | (2011.01) |
| *H01R 13/6596* | (2011.01) |

(52) U.S. Cl.

CPC ....... *H01R 13/6581* (2013.01); *H01R 12/724* (2013.01); *H01R 12/75* (2013.01); *H01R 13/6587* (2013.01); *H01R 13/648* (2013.01); *H01R 13/658* (2013.01); *H01R 13/6596* (2013.01)

(58) Field of Classification Search

CPC .. H01R 13/6581; H01R 12/724; H01R 12/75; H01R 13/6587; H01R 13/648; H01R 13/658; H01R 13/6596

See application file for complete search history.

(56) References Cited

U.S. PATENT DOCUMENTS 11,804,675 B2 * 10/2023 He ..................... H01R 13/6582
2020/0321727 A1 10/2020 Li et al.

* cited by examiner

*Primary Examiner* — Justin M Kratt

(74) *Attorney, Agent, or Firm* — Birch, Stewart, Kolasch & Birch, LLP

(57) ABSTRACT

A connector includes a metal shell, a terminal module fixed to the metal shell, and a cable electrically connected to the terminal module. The metal shell includes a main body and a shielding plate integrally formed with the main body. The terminal module includes a first terminal module and a second terminal module disposed on opposite sides of the shielding plate, respectively. By providing the first terminal module and the second terminal module on the opposite sides of the shielding plate, the signal shielding of the first terminal module and the second terminal module can be improved. Besides, by arranging the shielding plate and the main body integrally, the manufacturing cost can be saved. A connector assembly having the connector is also disclosed.

20 Claims, 6 Drawing Sheets

CONNECTOR AND ASSEMBLY THEREOF WITH FOOLPROOF STRUCTURE

CROSS-REFERENCE TO RELATED APPLICATION

This patent application claims priority of a Chinese Patent Application No. 202121340213.0, filed on Jun. 16, 2021 and titled "CONNECTOR AND ASSEMBLY THEREOF", the entire content of which is incorporated herein by reference.

TECHNICAL FIELD

The present disclosure relates to a connector and an assembly thereof, which belongs to a technical field of connectors.

BACKGROUND

An existing connector assembly usually includes a connector and a mating connector. The connector includes a metal shell, a terminal module fixed to the metal shell, and a cable electrically connected to the terminal module.

However, the connector in the relevant art has a large number of terminals and small intervals between the terminals, so the transmission quality needs to be improved. In addition, the connector in the relevant art is often inserted at a wrong angle when the connector is mated with the mating connector, thereby damaging the terminals.

SUMMARY

An object of the present disclosure is to provide a connector and an assembly thereof which can prevent a mating connector from being mated in a wrong direction.

In order to achieve the above object, the present disclosure adopts the following technical solution: a connector, including: a metal shell including a main body and a shielding plate extending and protruding from the main body, the shielding plate being integrally connected with the main body; a terminal module fixed to the metal shell, the terminal module including a first terminal module and a second terminal module which are disposed on opposite sides of the shielding plate, respectively; and a cable electrically connected to the first terminal module and the second terminal module.

In order to achieve the above object, the present disclosure adopts the following technical solution: a connector assembly, including: a connector, including: a metal shell including a main body, a shielding plate extending and protruding from the main body, and a positioning plate extending and protruding from the shielding plate; the shielding plate being integrally connected with the main body, the positioning plate including at least two positioning pieces arranged at intervals and with different sizes; a terminal module fixed to the metal shell, the terminal module including a first terminal module and a second terminal module which are disposed on opposite sides of the shielding plate; and a cable electrically connected to the first terminal module and the second terminal module; and a mating connector mated with the connector, the mating connector including a mating metal shell, the mating metal shell including a mating slot to receive the shielding plate, the mating metal shell including a lower wall provided with a plurality of positioning slots to receive the positioning pieces, the positioning slots being in communication with the mating slot.

Compared with the prior art, the connector of the present disclosure is provided with a shielding plate integrally formed on the metal shell, and a first terminal module and a second terminal module are provided on opposite sides of the shielding plate, respectively, thereby achieving signal shielding between the first terminal module and the second terminal module, preventing signal interference and improving the quality of signal transmission. Besides, the shielding plate is integrated with the main body, which not only reduces the production process, but also reduces the production cost and improves the production efficiency. In addition, the connector of the present disclosure has a positioning plate including at least two positioning pieces which are spaced apart and have different sizes. The mating connector has a positioning slot for accommodating the positioning piece. As a result, the connector can be prevented from being inserted into the mating connector at a wrong angle.

DETAILED DESCRIPTION

Figure 1:
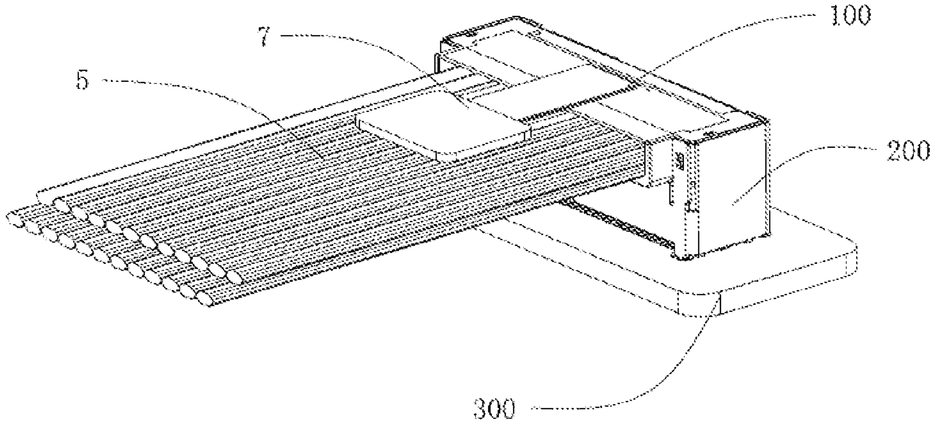
FIG. 1 is a perspective schematic view of a connector assembly in accordance with an embodiment of the present disclosure, in which a connector is mated with a mating connector, and the mating connector is mounted on a circuit board.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
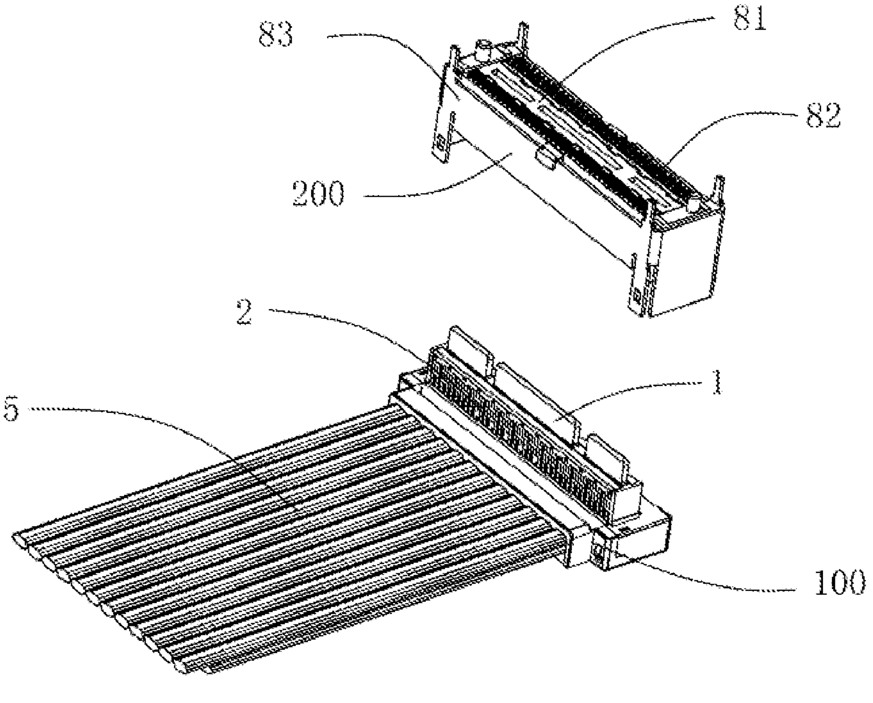
FIG. 2 is a perspective schematic view of the connector assembly in accordance with the embodiment of the present disclosure, in which the connector is separated from the mating connector.

Referring to FIGS. 1 and 2, the present disclosure discloses a connector assembly including a connector 100 and a mating connector 200 which are adapted to mate with each other. In the illustrated embodiment of the present disclosure, the connector 100 is a cable connector, and the mating connector 200 is a board-end connector for being mounted on a circuit board 300. The connector 100 is adapted to mate with the mating connector 200 for data transmission.

Figure 3:
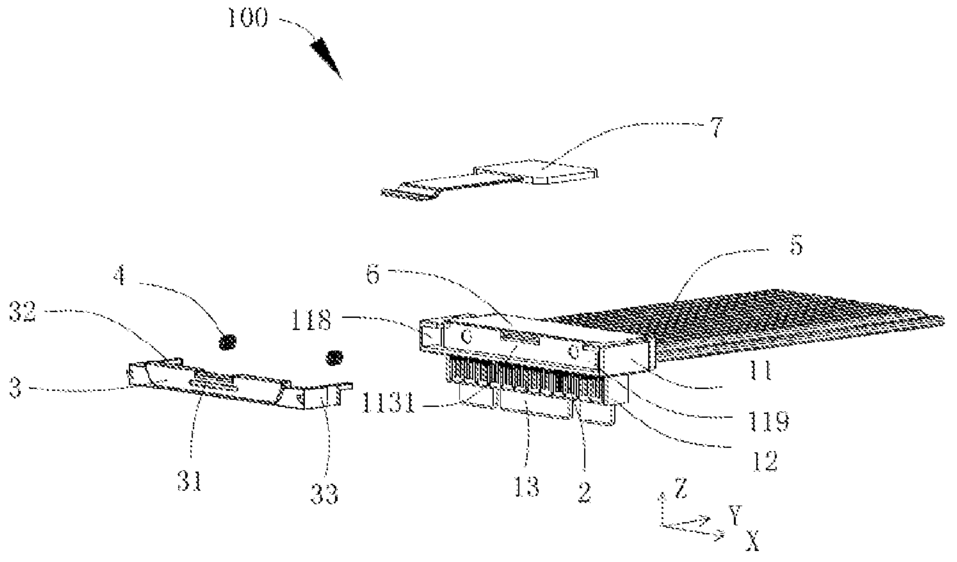
FIG. 3 is a partially exploded perspective view of the connector in accordance with the embodiment of the present disclosure.

For the accuracy description of the present disclosure, all descriptions of directions of the connector assembly in the present disclosure refer to FIG. 3. An extension direction of an X axis is a left-right direction, and it is defined that a positive direction of the X axis is a direction to the right. An extension direction of a Y-axis is a front-rear direction, and it is defined that a positive direction of the Y-axis is a direction to the rear. An extension direction of a Z axis is a top-bottom direction, and it is defined that a positive direction of the Z axis is a direction to the top. The connector and the mating connector are adapted to mate with each other in the top-bottom direction.

Figure 4:
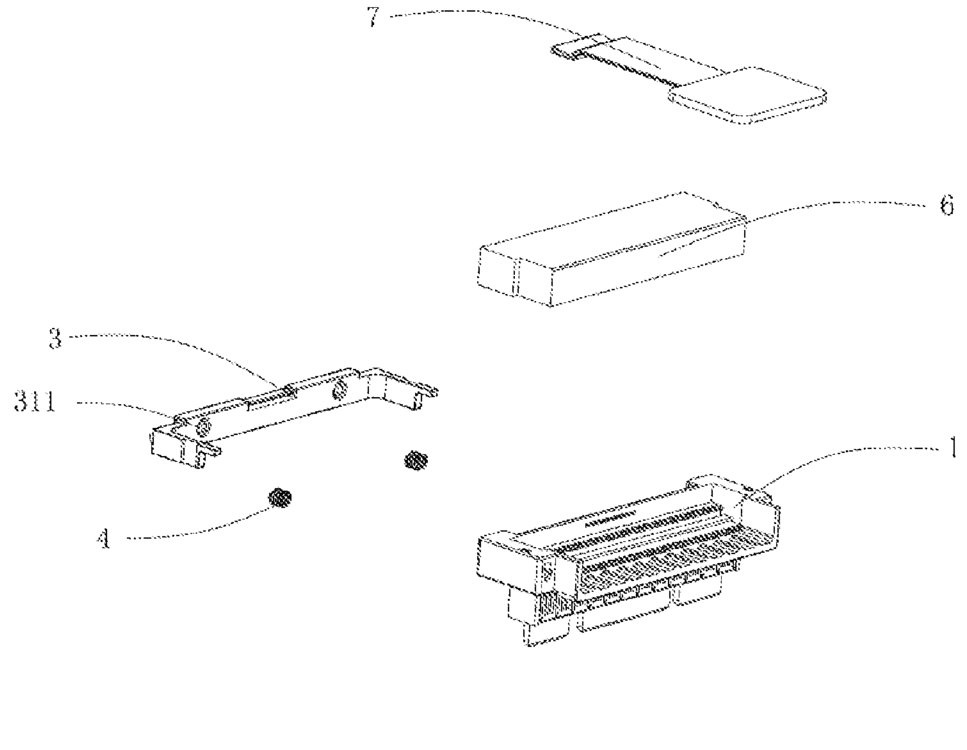
FIG. 4 is a partially exploded perspective view of FIG. 3 from another angle.
Figure 5:
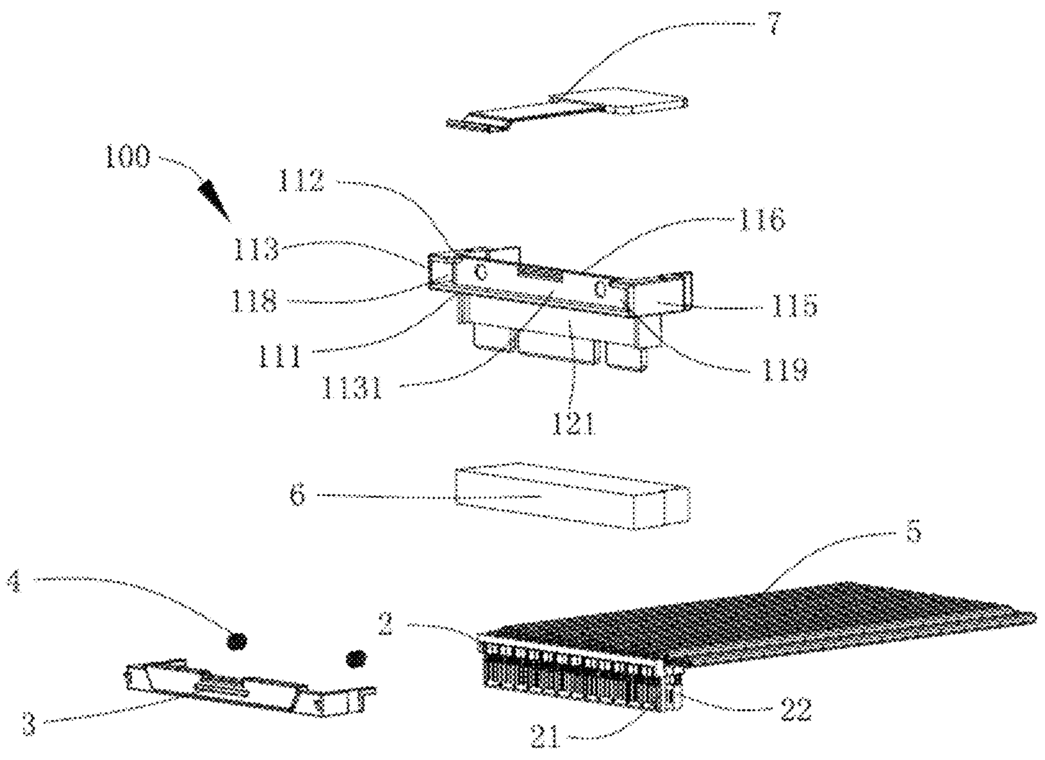
FIG. 5 is a further perspective exploded view of FIG. 3.

Referring to FIGS. 3 to 5, the connector 100 includes a metal shell 1, a terminal module 2 fixed to the metal shell 1, a movable member 3 assembled to the metal shell 1, an elastic member 4 used to abut against the movable member 3, a cable or cables 5 electrically connected to the terminal module 2, a cover plate 6 fastened to the metal shell 1 and at least partially abutting against the cables 5, and a pull strap 7 connected with the movable member 3. The pull strap 7 is capable of driving the movable member 3 to overcome the force of the elastic member 4 and to move in the front-rear direction.

The metal shell 1 includes a main body 11, a shielding plate 12 extending downwardly from the main body 11 and protruding beyond the main body 11, and a positioning plate 13 extending downwardly from the shielding plate 12 and protruding beyond the shielding plate 12. In the illustrated embodiment of the present disclosure, along the left-right direction and the front-rear direction, a size of the main body 11, a size of the shielding plate 12, and a size of the positioning plate 13 are sequentially reduced. Therefore, when viewed from a front-to-rear direction and a left-to-right direction, the metal shell 1 is substantially of a stepped configuration.

Figure 6:
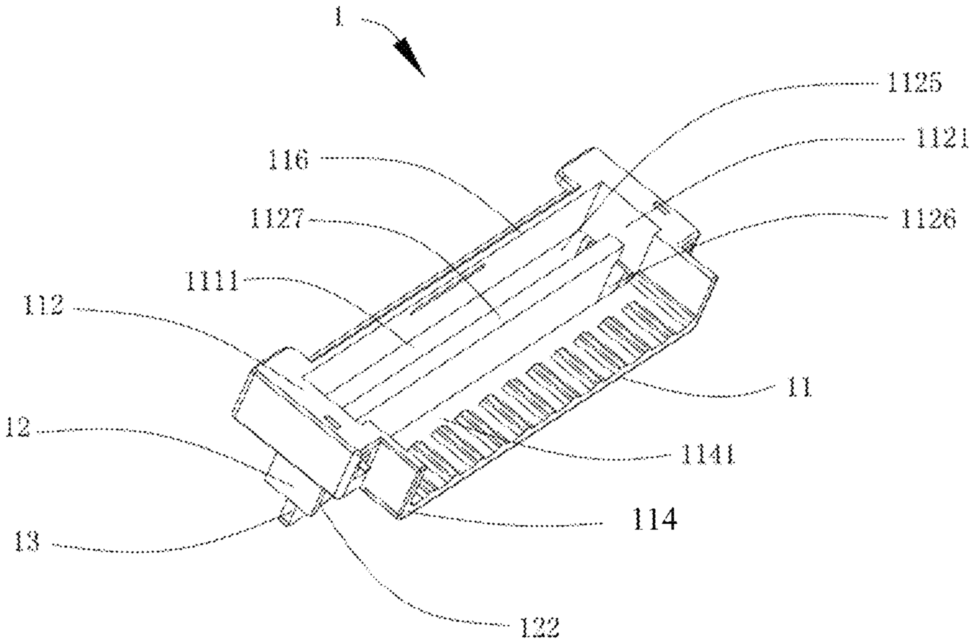
FIG. 6 is a perspective view of a metal shell of the connector in accordance with the embodiment of the present disclosure.

As shown in FIG. 6, the main body 11 includes a bottom wall 111, a top wall 112 opposite to the bottom wall 111, a front wall 113, a rear wall 114 opposite to the front wall 113, two side walls 115 connected between the top wall 112 and the bottom wall 111, a partition wall 116 connected between the two side walls 115, a receiving space 1131 located in front of the partition wall 116 and extending through the front wall 113, a first receiving slot 118 and a second receiving slot 119 located on left and right sides of the receiving space 1131, respectively, a connecting groove 1141 located behind the partition wall 116 and extending backwardly through the rear wall 114, a receiving space 1121 extending upwardly through the top wall 112, and a receiving groove 1111 extending downwardly through the bottom wall 111 from the connecting groove 1141.

The shielding plate 12 includes a first surface 121 and a second surface 122 which are opposite to each other.

Figure 7:
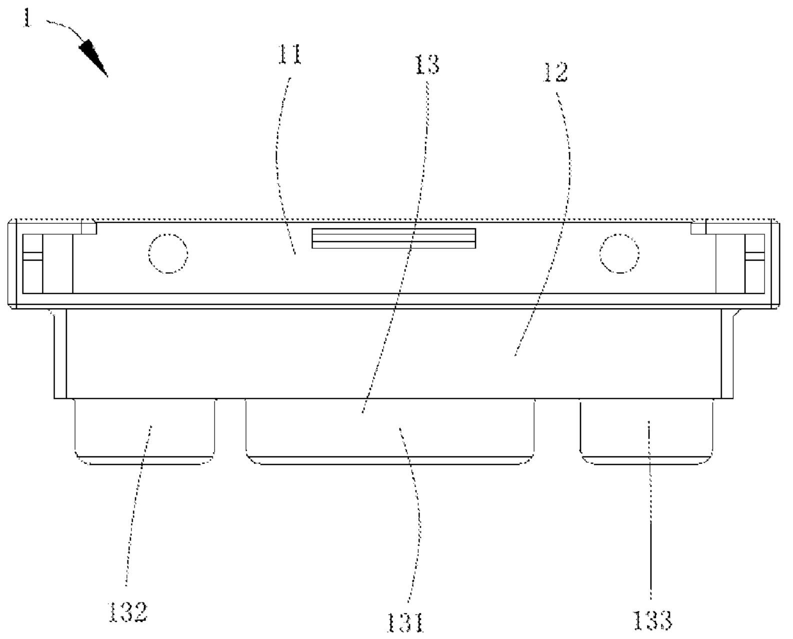
FIG. 7 is a front view of the metal shell of the connector in accordance with the embodiment of the present disclosure.

Referring to FIG. 7, in the illustrated embodiment of the present disclosure, the positioning plate 13 includes a first positioning piece 131 located in the middle, a second positioning piece 132 located on one side of the first positioning piece 131 and spaced apart from the first positioning piece 131, and a third positioning piece 133 located on the other side of the first positioning piece 131 and spaced apart from the first positioning piece 131. Preferably, in the left-right direction, a size of the first positioning piece 131 is larger than a size of the second positioning piece 132, and the size of the first positioning piece 131 is also larger than a size of the third positioning piece 133. In the illustrated embodiment of the present disclosure, the sizes of the first positioning piece 131, the second positioning piece 132, and the third positioning piece 133 are different, and a distance between the first positioning piece 131 and the second positioning piece 132 is different from a distance between the first positioning piece 131 and the third positioning piece 133. As a result, such features can play a foolproof effect, and can prevent the connector 100 from being mated with the mating connector 200 at a wrong angle.

Figure 8:
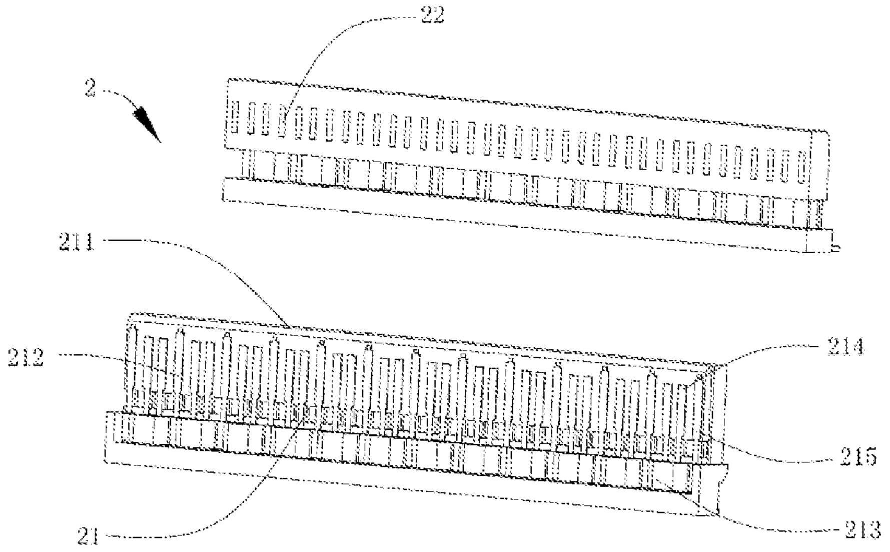
FIG. 8 is a perspective exploded view of a terminal module of the connector in accordance with the embodiment of the present disclosure.
Figure 9:
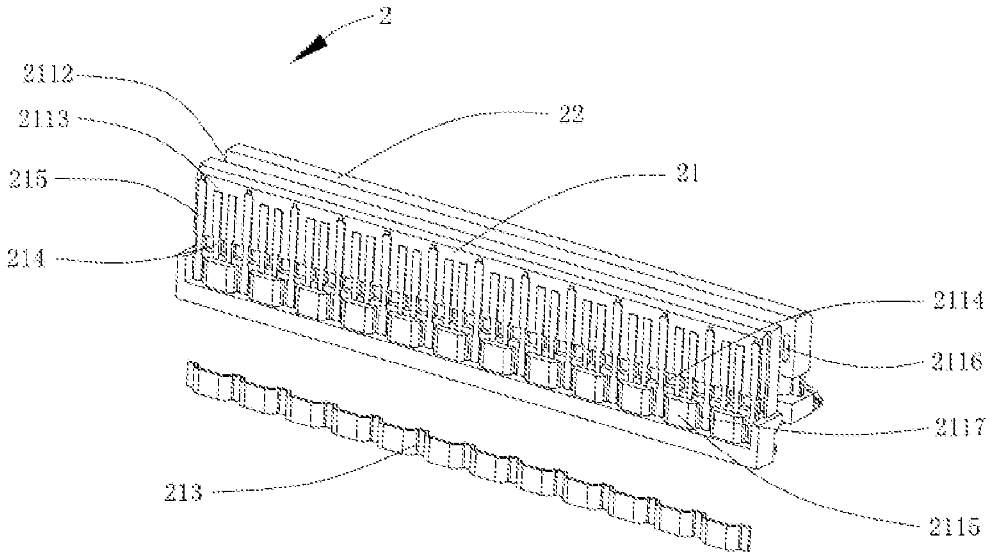
FIG. 9 is a further perspective exploded view of FIG. 8, in which a grounding piece is separated from an insulating block.
Figure 10:
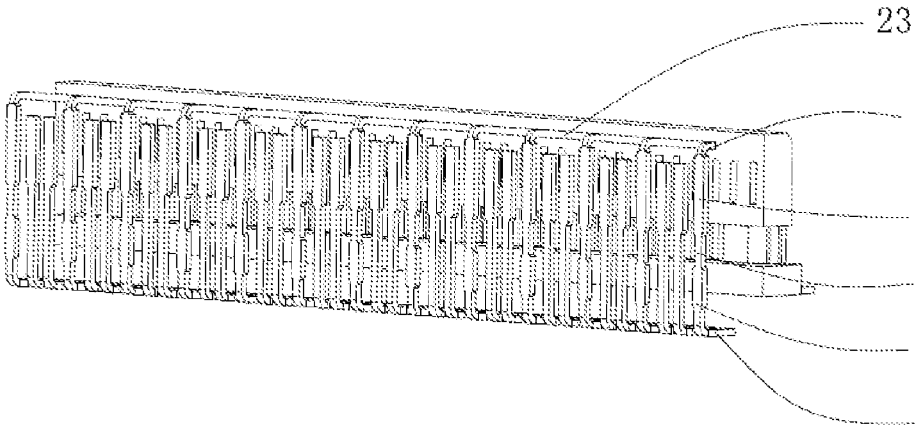
FIG. 10 is a perspective schematic view of FIG. 9 with the grounding piece and the insulating block removed.

Referring to FIGS. 8 to 10, the terminal module 2 includes a first terminal module 21 and a second terminal module 22 disposed on opposite sides of the metal shell 1, respectively. Specifically, the first terminal module 21 is disposed on the first surface 121 of the shielding plate 12, and the second terminal module 22 is disposed on the second surface 122 of the shielding plate 12. Furthermore, the receiving groove 1111 includes a first receiving groove 1125 to accommodate the first terminal module 21, a second receiving groove 1126 to accommodate the second terminal module 22, and a partition 1127 disposed between the first receiving groove 1125 and the second receiving groove 1126. The second receiving groove 1126 is spaced apart from the first receiving groove 1125.

In an embodiment of the present disclosure, the first terminal module 21 and the second terminal module 22 have the same structure, so only the first terminal module 21 will be described in detail hereinafter.

The first terminal module 21 includes an insulating block 211, a plurality of terminal groups 212 fixed to the insulating block 211, and a grounding piece 213. Each terminal group 212 includes a plurality of differential signal terminal pairs 214 and a plurality of ground terminals 215 of which each is located between two adjacent differential signal terminal pairs 214. By providing the ground terminal 215 between two adjacent differential signal terminal pairs 214, the present disclosure can better improve the transmission quality.

Each of the differential signal terminal pairs 214 and the ground terminals 215 has a fixing portion 216 at least partially embedded in the insulating block 211, an extension portion 217 extending from one end of the fixing portion 216, a mating portion 218 extending from one end of the extension portion 217, and a connecting portion 219 extending from the other end of the fixing portion 216 and electrically connected to the cable 5. The fixing portion 216 of the ground terminal 215 is partially exposed to the insulating block 211. The ground terminal 215 also has a contact portion 210 which further extends from the mating portion 218 and is embedded in the insulating block 211. The contact portion 210 of each ground terminal 215 is connected in series by a connecting bridge 23, thereby further improving the signal transmission quality.

The insulating block 211 includes a first end surface 2112 opposite to the shielding plate 12, and a second end surface 2113 disposed opposite to the first end surface 2112. The mating portion 218 is exposed to the second end surface 2113. The insulating block 211 also includes a plurality of spacing grooves 2114, a plurality of protrusions 2115 and a plurality of connecting grooves 2116. The spacing grooves 2114 are recessed from the second end surface 2113 in a direction close to the first end surface 2112, and located between two adjacent extension portions 217. The protrusions 2115 protrude from the second end surface 2113 in a direction away from the first end surface 2112 and are located between the fixing portions 216 of two adjacent ground terminals 215. The connecting grooves 2116 are recessed from the first end surface 2112 toward a direction close to the second end surface 2113 and correspond to the position of each of the mating portions 218. Each of the mating portions 218 is at least partially exposed in a corresponding connecting groove 2116.

A groove 2117 is formed between each two adjacent protrusions 2115. The fixing portions 216 of the differential signal terminal pair 214 are embedded in the protrusion 2115. The fixing portion 216 of the ground terminal 215 is partially exposed in the groove 2117. A plurality of grooves 2117 form a wave-shaped mounting groove. A shape of the grounding piece 213 is of a long wave configuration. The grounding piece 213 is received in the mounting groove and covers the plurality of protrusions 2115 and the fixing portions 216 of the ground terminals 215 exposed in the grooves 2117, thereby enabling more stable signal transmission.

Referring to FIGS. 3 to 6, the movable member 3 is at least partially installed in the main body 11. Specifically, the movable member 3 includes a base 31 received in the receiving space 1131, a first push rod 32 extending from one side of the base 31 and received in the first receiving slot 118, and a second push rod 33 extending from the other side of the base 31 and received in the second receiving slot 119.

In the illustrated embodiment of the present disclosure, the elastic member 4 is a compression spring installed between the base 31 and the partition wall 116 of the main body 11. Preferably, two compression springs are provided and arranged side by side so as to improve the stability of the movable member 3 when moving. In addition, in order to better position the compression spring. The base 31 is also provided with at least one positioning post 311 at least partially inserted into the compression spring.

In the illustrated embodiment of the present disclosure, the cables 5 extend beyond the main body 11 in the front-rear direction and extend through the connecting grooves 1141 to be electrically connected to the terminal module 2. The cover plate 6 is received and fixed in the receiving space 1121 of the main body 11. The pull strap 7 extends beyond the cover plate 6. In an embodiment of the present disclosure, the cover plate 6 presses against connection portions between the cables 5 and the terminal module 2 for protection.

Figure 11:
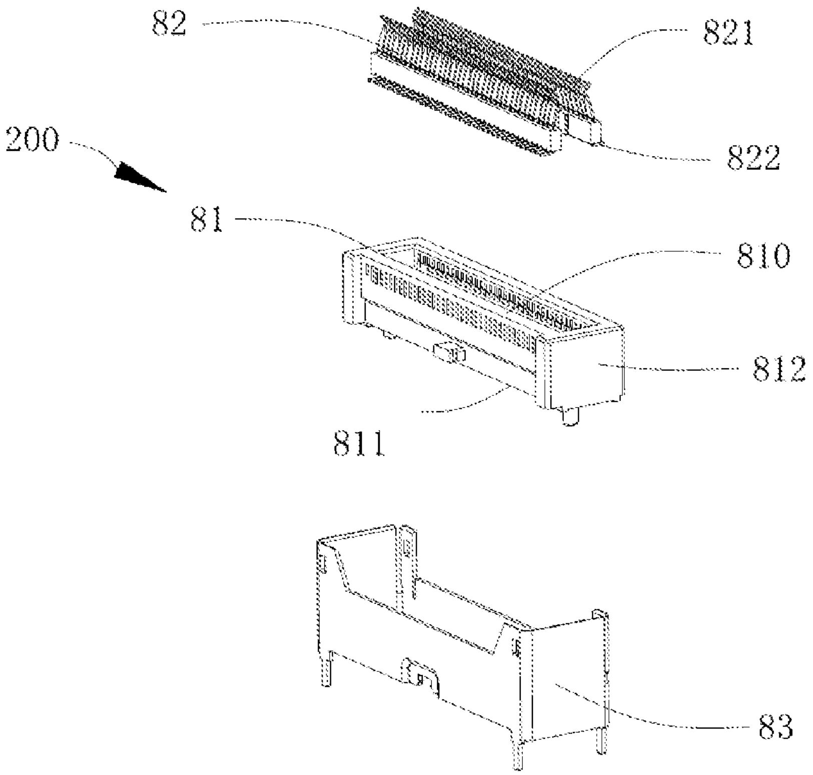
FIG. 11 is a perspective exploded view of the mating connector in accordance with an embodiment of the present disclosure.
Figure 12:
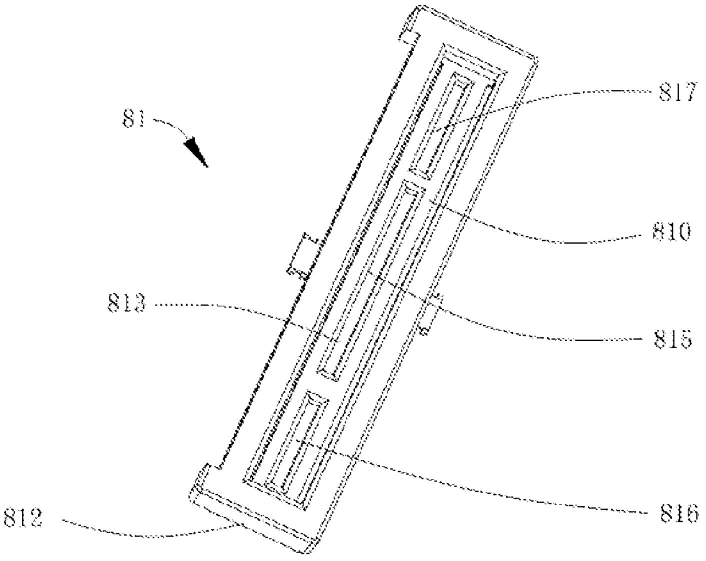
FIG. 12 is a perspective view of a mating metal shell of the mating connector in accordance with the embodiment of the present disclosure.

Referring to FIGS. 11 and 12, the mating connector 200 includes a mating metal shell 81, a plurality of mating terminals 82 fixed to the mating metal shell 81, and an outer metal shell 83 covering the mating metal shell 81.

The mating metal shell 81 includes a lower wall 811 and a plurality of connecting walls 812 perpendicular to the lower wall 811. The connecting walls 812 and the bottom wall 811 is enclosed to form a mating slot 810 for receiving the shielding plate 12. The lower wall 811 is provided with a plurality of positioning slots 813 for receiving the positioning plate 13. The positioning slots 813 are in communication with the mating slot 810. Specifically, the positioning slots 813 include a first positioning slot 815 to receive the first positioning piece 131, a second positioning slot 816 to receive the second positioning piece 132, and a third positioning slot 817 to receive the third positioning piece 133. In the illustrated embodiment of the present disclosure, the first positioning slot 815, the second positioning slot 816 and the third positioning slot 817 extend through the lower wall 811.

In the embodiment disclosed in the present disclosure, the positioning plate 13 of the connector 100 is provided with three positioning pieces 131, 132, 133. Correspondingly, the number of the positioning slots 813 of the mating connector 200 is also set to three. In other embodiments, the number of the positioning pieces 131, 132, 133 and the number of the positioning slots 813 may be adjusted according to actual needs. As long as there are at least two spaced positioning pieces with different sizes to mate with corresponding positioning slots, it can play a role in preventing foolishness.

The mating terminals 82 are arranged in two rows. Each mating terminal 82 includes an elastic mating arm 821 and a mounting tail 822 for being mounted to the circuit board 300. The elastic mating arms 821 extend into the mating slot 810 and are used to contact the mating portions 218.

When the connector 100 is inserted into the mating connector 200, the positioning plate 13 is correspondingly inserted into the positioning slot 813, the shielding plate 12 is inserted into the mating slot 810 correspondingly, and the mating portions 218 of the terminal module 2 are mated with the elastic mating arms 821 of the mating terminals 82. When the connector 100 needs to be pulled out, an external force is applied to pull the pull strap 7. The pull strap 7 generates a force component in the front-rear direction. The component force in this direction overcomes the force of the elastic member 4 and causes the movable member 3 to move in the front-rear direction, thereby pulling the connector 100 out of the mating connector 200.

The metal shell 1 of the connector 100 of the present disclosure is provided with the positioning plate 13 having a plurality of positioning pieces 131, 132, 133, and the sizes of the positioning pieces 131, 132, 133 are different. The mating metal shell 81 of the mating connector 200 is provided with the positioning slots 813 corresponding to the positioning plate 13. The positioning slots 813 include a plurality of positioning slots 815, 816, 817 corresponding to the positioning pieces 131, 132, 133. During the insertion process, these features can well prevent the connector 100 from being inserted into the mating connector 200 at a wrong angle.

The terminal module 2 of the connector 100 of the present disclosure includes the first terminal module 21 and the second terminal module 22 disposed on the opposite sides of the metal shell 1, respectively. The shielding plate 12 of the metal shell 1 is used to separate the first terminal module 21 and the second terminal module 22, which can reduce signal interference and improve transmission quality. Each of the ground terminals 215 is arranged between two adjacent pairs of the differential signal terminal pairs 214, which can better improve the transmission quality. The ground terminal 215 also has the contact portion 210 further extending from the mating portion 218 and embedded in the insulating block 211. The contact portions 210 are connected in series by the connecting bridge 23, thereby further improving the signal transmission quality. The insulating block 211 has a plurality of the spacing grooves 2114 located between two adjacent extension portions 217, a plurality of the protrusions 2115 located between the fixing portions 216 of two adjacent ground terminals 215, and a plurality of connecting grooves 2116 corresponding to the position of each of the mating portions 218. Each of the mating portions 218 is at least partially exposed in the connecting groove 2116. The groove 2117 is formed between two adjacent protrusions 2115. The fixing portions 216 of the differential signal terminal pair 214 are embedded in the protrusion 2115. The fixing portion 216 of the ground terminal 215 is partially exposed in the groove 2117. The grounding piece 213 covers the plurality of the protrusions 2115 and the plurality of the fixing portions 216 of the ground terminal 215 which are exposed in the grooves 2117, so that the signal can be transmitted more stably.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector, comprising:

a metal shell comprising a main body and a shielding plate extending and protruding from the main body, the shielding plate being integrally connected with the main body;

a terminal module fixed to the metal shell, the terminal module comprising a first terminal module and a second terminal module which are disposed on opposite sides of the shielding plate, respectively; and a cable electrically connected to the first terminal module and the second terminal module;

wherein the metal shell further comprises a positioning plate extending and protruding from the shielding plate, and the positioning plate comprises at least two positioning pieces arranged at intervals and with different sizes.

2. The connector according to claim 1, wherein the positioning plate comprises a first positioning piece, a second positioning piece and a third positioning piece; and wherein the second positioning piece and the third positioning piece are spaced apart from the first positioning piece, and are located on opposite sides of the first positioning piece, respectively.

3. The connector according to claim 2, wherein a size of the first positioning piece is larger than a size of the second positioning piece, and the size of the first positioning piece is larger than a size of the third positioning piece.

4. The connector according to claim 3, wherein a distance between the first positioning piece and the second positioning piece is different from a distance between the first positioning piece and the third positioning piece.

5. The connector according to claim 4, wherein the shielding plate comprises a first surface and a second surface which are arranged oppositely, the first terminal module is provided on the first surface, and the second terminal module is provided on the second surface.

6. The connector according to claim 3, wherein each of the first terminal module and the second terminal module comprises an insulating block and a plurality of terminal groups provided on the insulating block; and wherein each terminal group comprises a plurality of differential signal terminal pairs and a ground terminal located between two adjacent differential signal terminal pairs.

7. The connector according to claim 6, wherein each of the first terminal module and the second terminal module comprises a grounding piece which is welded or soldered to the ground terminal.

8. The connector according to claim 6, wherein the main body further comprises a connecting groove and a receiving groove extending downwardly through a bottom wall from the connecting groove, the cable extends beyond the main body in a front-rear direction and extend through the connecting groove to be electrically connected to the first terminal module and the second terminal module, the receiving groove comprises a first receiving groove to accommodate the first terminal module and a second receiving groove to accommodate the second terminal module, and the second receiving groove is spaced apart from the first receiving groove.

9. The connector according to claim 1, wherein the first terminal module comprises an insulating block and a plurality of terminals fixed to the insulating block; each terminal comprises a mating portion exposed on a surface; the mating portions of the plurality of terminals are disposed at intervals on the surface of the insulating block.

10. A connector, comprising:

a metal shell comprising a main body and a shielding plate extending and protruding from the main body, the shielding plate being integrally connected with the main body;

a terminal module fixed to the metal shell, the terminal module comprising a first terminal module and a second terminal module which are disposed on opposite sides of the shielding plate, respectively; and a cable electrically connected to the first terminal module and the second terminal module;

wherein the connector further comprises a movable member assembled to the metal shell, an elastic member abutting against the movable member, and a pull strap connected with the movable member; wherein the movable member includes a base, a first push rod extending from one side of the base and a second push rod extending from another side of the base; and wherein the pull strap is capable of driving the movable member to overcome a force of the elastic member and to move.

11. The connector according to claim 10, wherein the first terminal module comprises an insulating block and a plurality of terminals fixed to the insulating block; each terminal comprises a mating portion exposed on a surface; the mating portions of the plurality of terminals are disposed at intervals on the surface of the insulating block.

12. A connector assembly, comprising:

a connector, comprising:

a metal shell comprising a main body, a shielding plate extending and protruding from the main body, and a positioning plate extending and protruding from the shielding plate; the shielding plate being integrally connected with the main body, the positioning plate comprising at least two positioning pieces arranged at intervals and with different sizes;

a terminal module fixed to the metal shell, the terminal module comprising a first terminal module and a second terminal module which are disposed on opposite sides of the shielding plate; and a cable electrically connected to the first terminal module and the second terminal module; and a mating connector mated with the connector, the mating connector comprising a mating metal shell, the mating metal shell comprising a mating slot to receive the shielding plate, the mating metal shell comprising a lower wall provided with a plurality of positioning slots to receive the positioning pieces, the positioning slots being in communication with the mating slot.

13. The connector assembly according to claim 12, wherein the positioning plate comprises a first positioning piece, a second positioning piece and a third positioning piece; and wherein the second positioning piece and the third positioning piece are spaced apart from the first positioning piece, and are located on opposite sides of the first positioning piece, respectively.

14. The connector assembly according to claim 13, wherein a size of the first positioning piece is larger than a size of the second positioning piece, and the size of the first positioning piece is larger than a size of the third positioning piece.

15. The connector assembly according to claim 14, wherein a distance between the first positioning piece and the second positioning piece is different from a distance between the first positioning piece and the third positioning piece.

16. The connector assembly according to claim 15, wherein the shielding plate comprises a first surface and a second surface which are arranged oppositely, the first terminal module is provided on the first surface, and the second terminal module is provided on the second surface.

17. The connector assembly according to claim 14, wherein each of the first terminal module and the second terminal module comprises an insulating block and a plurality of terminal groups provided on the insulating block; and wherein each terminal group comprises a plurality of differential signal terminal pairs and a ground terminal located between two adjacent differential signal terminal pairs.

18. The connector assembly according to claim 17, wherein each of the first terminal module and the second terminal module comprises a grounding piece which is welded or soldered to the ground terminal.

19. The connector assembly according to claim 17, wherein the main body further comprises a connecting groove and a receiving groove extending downwardly through a bottom wall from the connecting groove, the cable extends beyond the main body in a front-rear direction and extend through the connecting groove to be electrically connected to the first terminal module and the second terminal module, the receiving groove comprises a first receiving groove to accommodate the first terminal module and a second receiving groove to accommodate the second terminal module, and the second receiving groove is spaced apart from the first receiving groove.

20. The connector assembly according to claim 12, wherein the connector further comprises a movable member assembled to the metal shell, an elastic member abutting against the movable member, and a pull strap connected with the movable member; wherein the movable member includes a base, a first push rod extending from one side of the base and a second push rod extending from another side of the base; and wherein the pull strap is capable of driving the movable member to overcome a force of the elastic member and to move in a front-rear direction.

* * * * *